(No Model.)
J. ANTHON.
APPARATUS FOR MANUFACTURING WOODEN CASKS, BARRELS, &c.
No. 585,810. Patented July 6, 1897.
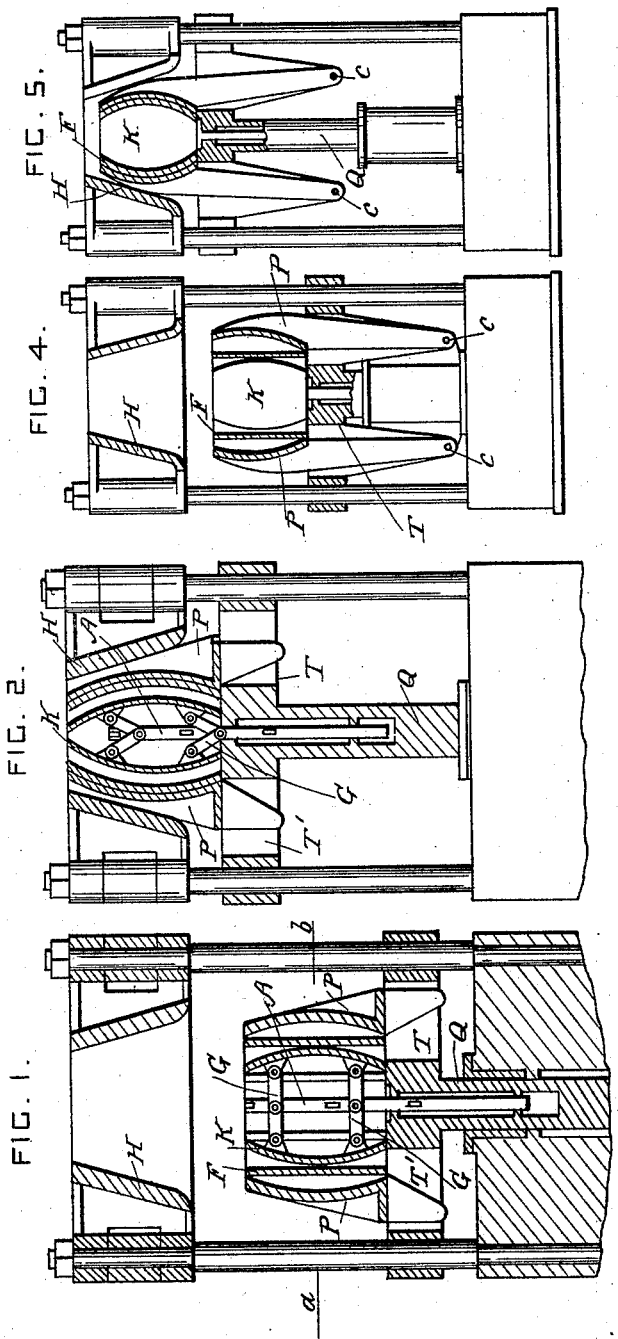
WITNESSES
George H. Bliss Jr.
Walter Allen
INVENTOR
Johann Anthon.
by Herbert W. T. Jenner.
Attorney

UNITED STATES PATENT OFFICE.

JOHANN ANTHON, OF FLENSBURG, GERMANY.

APPARATUS FOR MANUFACTURING WOODEN CASKS, BARRELS, &c.

SPECIFICATION forming part of Letters Patent No. 585,810, dated July 6, 1897.

Application filed October 1, 1895. Serial No. 564,287. (No model.) Patented in England September 26, 1895, No. 18,006.

*To all whom it may concern:*

Be it known that I, JOHANN ANTHON, a subject of the King of Prussia, German Emperor, residing at Flensburg, Prussia, Germany, have invented certain new and useful Improvements in Apparatus for Manufacturing Wooden Casks, Barrels, or other Vessels of a Like Nature; and I do hereby declare the following to be a full, clear, and exact description of the invention, such as will enable others skilled in the art to which it appertains to make and use the same.

A patent for this invention has been granted in England, No. 18,006, dated September 26, 1895.

According to my invention I first steam or boil the wood, so as to render it soft and pliable, and afterward apply great pressure to the materials in suitably-formed molds, whereby the fibers of the wood are compressed and condensed and rendered hard and durable, and whereby soft and inferior kinds of wood may be substituted for the more expensive kinds.

In order that my said invention may be particularly described and ascertained, reference is hereby made to the accompanying drawings, in which similar letters of reference indicate corresponding parts.

Figure 1 is a sectional elevation of a press suitable for making casks according to my invention, the platform being shown down and the material of the cask being shown in position ready for being molded into form. Fig. 2 is a sectional elevation showing the material of the cask molded under pressure. Fig. 3 is a transverse section. Fig. 4 is a sectional elevation showing other methods of forming the mold and core with the platform down. Fig. 5 is a sectional elevation of the same with the platform raised and the cask molded under pressure. Fig. 6 illustrates one method of preparing the wood for the press. Fig. 7 is a sectional elevation, and Fig. 8 a transverse section, illustrating another method of constructing the core-mold.

Referring to Figs. 1, 2, and 3, T is the table carried by the piston Q of a press worked by hydraulic power. H is a conical top to the press. P P are radial ribs, the lower ends of which are capable of sliding radially in guide-slots T', formed in the table T. The inner faces of these ribs when close together form the mold to the outside of the cask. The mold forming the core of the cask is shown formed of four ribs K K, capable of being expanded by toggle-levers G G, pivoted to the central rod A, which may be raised by hydraulic power or by a treadle, so as to forcibly expand the core. F is the wooden cylinder, which may consist of one piece or several pieces placed together and of larger circumference than that of the intended cask. When formed of one piece and intended for a cask curved at each end, a number of wedge pieces are cut out at each end, as shown in Fig. 6. The wooden cylinder F is placed in position, as shown in Fig. 1, with the ribs P P moved outward radially. On the platform T being raised to the position shown in Fig. 2 the cone H, acting upon the inclined backs of the ribs P P, forces the ribs centripetally upon the wooden cylinder F, whereby the same is compressed to the required form and dimensions. On lowering the rod A the toggle-levers G G immediately collapse the core K, and on lowering the platform T the outer mold P P can be expanded and the shell of the cask removed.

Referring to Figs. 4 and 5, the pieces P P, forming the external mold, have elongated ends pivoted to the platform of the press at *c c*, whereby the mold is rendered capable of being opened and closed as required.

Referring to Figs. 7 and 8, the pieces K of the core-mold are shown, so that they may be expanded and contracted by means of eccentrics *e e*, keyed to the vertical bar *a*, the eccentric-rods being pivoted to the core-pieces K K at *d*, as shown. The pieces may be expanded or contracted by turning the bar *a*. In making conical vessels the material is tapered at one end only, if formed of separate staves or with wedge-shaped openings, as shown in Fig. 6, at one end, if cut from an entire cylinder. In making cylindrical vessels parallel staves or an entire cylinder of wood may be used, the molds and cores being so shaped as to suit the required construction, and the cores being in one piece, as they do not require to be reduced when removing the compressed vessel.

Having thus fully described my invention, I claim as new and desire to secure by Letters Patent—

1. The combination, with a press having a conical top and provided with a platen having radial guide-slots, of a mold comprised of contractible ribs arranged in a circle, provided with end portions slidable in the said slots, and downwardly and outwardly inclined back portions; a core comprised of expansible sections arranged in a circle and resting on the said platen, and means for expanding the core, substantially as set forth.

2. The combination, with a press having a conical top and provided with a platen having radial guide-slots, of a mold comprised of contractible ribs arranged in a circle, provided with end portions slidable in the said slots, and downwardly and outwardly inclined back portions; a core comprised of expansible sections arranged in a circle and resting on the said platen, a vertical bar slidable in the said platen, and toggle-levers pivoted to the said bar and to the sections of the core, substantially as set forth.

3. In a barrel-press, the combination, with an inner part or core, of an outer part or mold formed of slidable ribs surrounding the core, a guide constraining the said ribs to slide bodily upon a plane at right angles to the axis of the core, and mechanism operating to slide the said ribs toward the core, substantially as set forth.

4. In a barrel-press, the combination, with an inner part or core formed of collapsible segments, and means for holding the said segments expanded while the material is being pressed upon them; of an outer part or mold formed of slidable ribs surrounding the core, a guide constraining the said ribs to slide bodily in a plane at right angles to the axis of the core, and mechanism operating to slide the said ribs toward the core, substantially as set forth.

In testimony whereof I have affixed my signature in presence of two witnesses.

JOHANN ANTHON.

Witnesses:
   TENS HANSEN,
   WILHELM BRANDES.